(12) United States Patent
Nakamura et al.

(10) Patent No.: US 11,203,317 B2
(45) Date of Patent: Dec. 21, 2021

(54) VEHICLE WITH OCCUPANT PROTECTION FUNCTION

(71) Applicant: SUBARU CORPORATION, Tokyo (JP)

(72) Inventors: Ryota Nakamura, Tokyo (JP); Junpei Tokizaki, Tokyo (JP); Masayuki Marubashi, Tokyo (JP); Keita Onishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/739,386

(22) Filed: Jan. 10, 2020

(65) Prior Publication Data

US 2020/0290540 A1 Sep. 17, 2020

(30) Foreign Application Priority Data

Mar. 15, 2019 (JP) .............................. JP2019-049207

(51) Int. Cl.
*B60R 21/015* (2006.01)
*G06K 9/00* (2006.01)
*B60R 21/01* (2006.01)
*B60R 21/013* (2006.01)

(52) U.S. Cl.
CPC .... *B60R 21/0155* (2014.10); *B60R 21/01538* (2014.10); *G06K 9/00832* (2013.01); *B60R 2021/01013* (2013.01); *B60R 2021/01265* (2013.01); *B60R 2021/01317* (2013.01)

(58) Field of Classification Search
CPC ...... B60R 21/0155; B60R 2021/01317; B60R 2021/01265; B60R 2021/01013; B60R 21/01538; G06K 9/00832
See application file for complete search history.

(56) References Cited

U.S. PATENT DOCUMENTS

| 6,227,564 | B1 | 5/2001 | Ikegami | |
|---|---|---|---|---|
| 2004/0084890 | A1* | 5/2004 | Tobata | B60R 21/013 280/806 |
| 2016/0090063 | A1* | 3/2016 | Onishi | B60N 2/002 701/46 |
| 2020/0334477 | A1* | 10/2020 | Aoi | G06K 9/00302 |

FOREIGN PATENT DOCUMENTS

JP 2000-016230 A 1/2000

* cited by examiner

*Primary Examiner* — Mathew Franklin Gordon
(74) *Attorney, Agent, or Firm* — Troutman Pepper Hamilton Sanders LLP

(57) ABSTRACT

A vehicle with an occupant protection function includes an occupant protection device and an occupant monitoring device. The occupant protection device is provided in the vehicle and configured to perform protection operation of supporting, with a seatbelt, an occupant in the vehicle upon collision of the vehicle. The occupant monitoring device is provided in the vehicle and configured to monitor the occupant in the vehicle. The occupant monitoring device is configured to determine whether the occupant in the vehicle is aware of the collision of the vehicle. The occupant protection device is configured to, in a case where the occupant monitoring device determines that the occupant is unaware of the collision of the vehicle, increase tension of the seatbelt gradually as compared with a case where the occupant monitoring device determines that the occupant is aware of the collision.

6 Claims, 6 Drawing Sheets

VEHICLE WITH OCCUPANT PROTECTION FUNCTION

CROSS-REFERENCE TO RELATED APPLICATIONS

The present application claims priority from Japanese Patent Application No. 2019-049207 filed on Mar. 15, 2019, the entire contents of which are hereby incorporated by reference.

BACKGROUND

The technology relates to a vehicle with an occupant protection function.

To protect an occupant, a vehicle uses an occupant protection device such as a seatbelt device. Reference is made to Japanese Unexamined Patent Application Publication (JP-A) No. 2000-016230, for example.

SUMMARY

An aspect of the technology provides a vehicle with an occupant protection function. The vehicle includes an occupant protection device and an occupant monitoring device. The occupant protection device is provided in the vehicle and configured to perform protection operation of supporting, with a seatbelt, an occupant in the vehicle upon collision of the vehicle. The occupant monitoring device is provided in the vehicle and configured to monitor the occupant in the vehicle. The occupant monitoring device is configured to determine whether the occupant in the vehicle is aware of the collision of the vehicle to occur. The occupant protection device is configured to, in a case where the occupant monitoring device determines that the occupant is unaware of the collision of the vehicle to occur, increase tension of the seatbelt gradually as compared with a case where the occupant monitoring device determines that the occupant is aware of the collision.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1A:
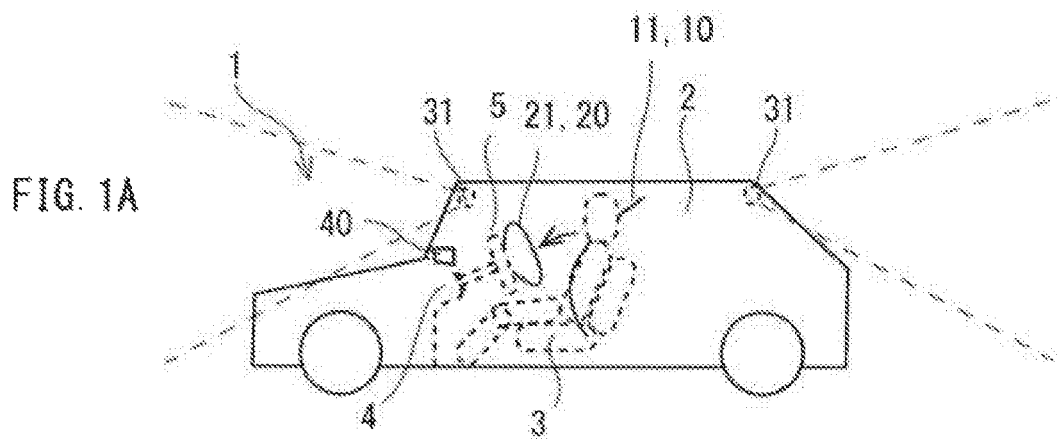
FIGS. 1A to 1C are schematic explanatory diagrams illustrating an automobile that is applicable to a traffic system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1B:
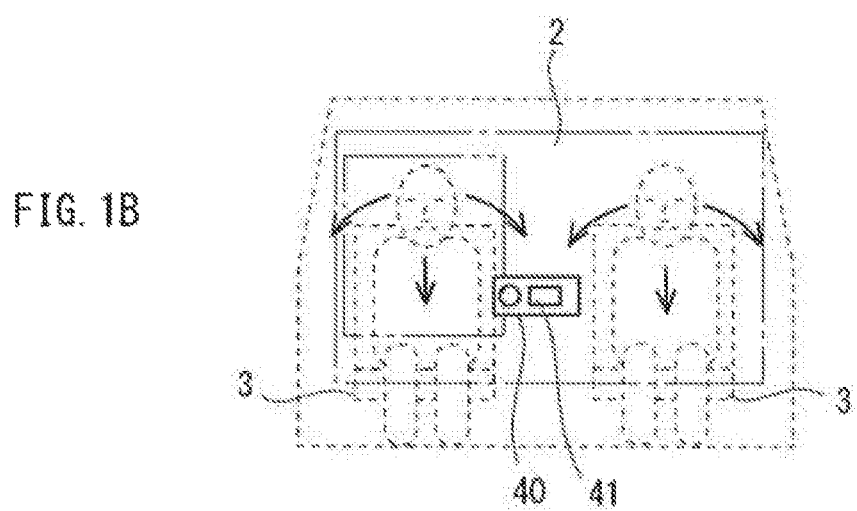
Figure 1C:
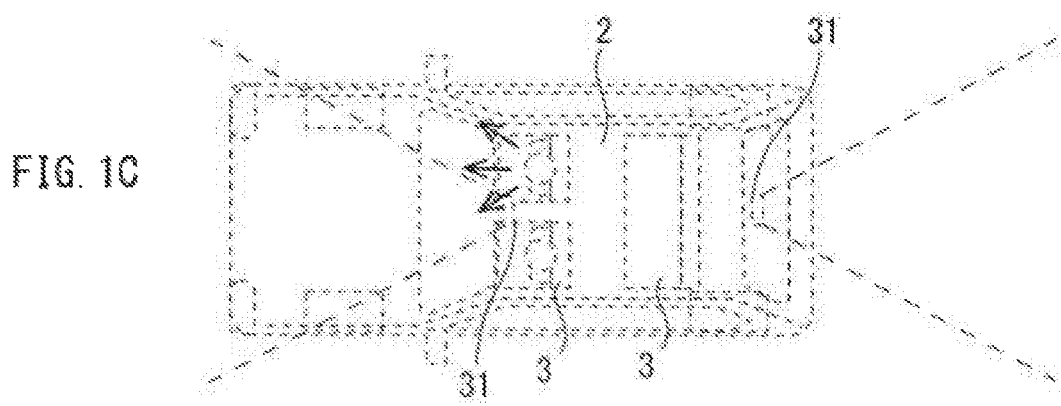

FIGS. 1A to 1C are schematic explanatory diagrams illustrating an automobile 1 that is applicable to a traffic system 80 according to one example embodiment of the technology.

FIG. 1A is a side view, FIG. 1B is a cross-sectional view, and FIG. 1C is a top view.

The automobile 1 in FIGS. 1A to 1C is an example of a vehicle. The automobile 1 may include a cabin 2 that is provided in the middle of a body and allows an occupant to be on board. The cabin 2 may be provided with seats 3 in each of which the occupant may sit. The cabin 2 may be provided with a toe board 4 in a front part. On the front side of the seats 3, a steering wheel 5 may protrude rearward from the toe board 4. It is possible for the occupant to sit in the seat 3 and operate an operating member such as the steering wheel 5.

Figure 2:
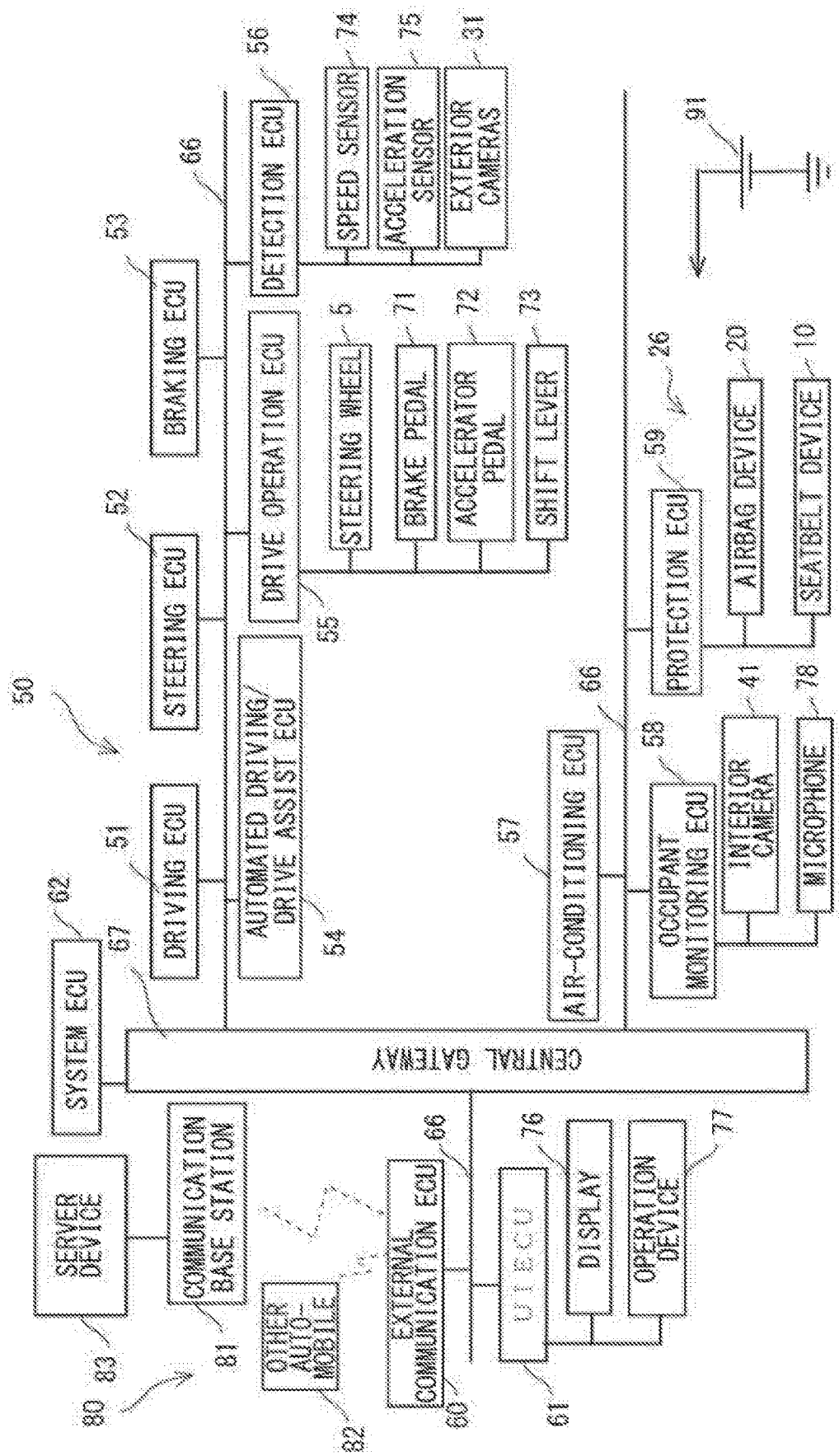
FIG. 2 is a schematic explanatory diagram illustrating a control system of the automobile illustrated in FIGS. 1A to 1C.

FIG. 2 is a schematic explanatory diagram illustrating a control system 50 of the automobile 1. FIG. 2 also illustrates control electronic control units (ECUs) that are included in respective control modules. The control modules represented by the control ECUs may constitute the control system 50.

For example, FIG. 2 illustrates a driving ECU 51, a steering ECU 52, a braking ECU 53, an automated driving/drive assist ECU 54, a drive operation ECU 55, a detection ECU 56, an air-conditioning ECU 57, an occupant monitoring ECU 58, a protection ECU 59, an external communication ECU 60, a UIECU 61, and a system ECU 62. These control ECUs may be coupled to a central gateway (CGW) 67 serving as a relay via an in-vehicle network 66 that is adopted in the automobile 1. Examples of the in-vehicle network 66 may include a Controller Area Network (CAN) and a Local Interconnect Network (LIN). The in-vehicle network 66 may couple, for example, the occupant monitoring ECU 58 of an occupant monitoring device 40 to the protection ECU 59 of an occupant protection device 26.

In each control module, the control ECU may be coupled to an electronic apparatus that is used in the automobile 1. Being activated, the control ECU may perform various processes, and control operation of the electronic apparatus coupled to the control ECU, on the basis of information (data) acquired from the in-vehicle network 66. The control ECU may also output, to the in-vehicle network 66, information (data) such as an operation state of the electronic apparatus coupled to the control ECU.

For example, the drive operation ECU 55 may be coupled to operation detection sensors including the steering wheel 5, a brake pedal 71, an accelerator pedal 72, and a shift lever 73. The occupant may operate the operation detection sensors to control traveling of the automobile 1. The drive operation ECU 55 may output control information corresponding to amounts of operation to the in-vehicle network 66. The driving ECU 51, the steering ECU 52, and the braking ECU 53 may acquire information from the in-vehicle network 66, and control traveling of the automobile 1.

The detection ECU 56 may be coupled to elements including a speed sensor 74, an acceleration sensor 75, and exterior cameras 31 of the automobile 1. The acceleration sensor 75 may be able to detect an acceleration of the automobile 1 due to collision, for example. The detection ECU 56 may output, to the in-vehicle network 66, information such as values of the speed sensor 74 and the acceleration sensor 75 of the automobile 1 and images of the exterior cameras 31. The detection ECU 56 may predict collision on the basis of the images of the exterior cameras 31, and output a prediction result to the in-vehicle network 66. The central gateway 67 may relay information. The UIECU 61 may acquire information from the in-vehicle network 66, and display the information on a display 76 coupled to the UIECU 61. The UIECU 61 may be coupled to, as well as the display 76, an operating device 77 to be operated by the occupant.

The occupant monitoring ECU 58 may be coupled to an interior camera 41 and a microphone 78. The occupant monitoring ECU 58 may be a control ECU of the occupant monitoring device 40. The occupant monitoring ECU 58 may perform various processes related to the occupant in the automobile 1, depending on information such as the image of the interior camera 41, sound of the microphone 78, or an acceleration of impact, for example, acquired from the in-vehicle network 66. The occupant monitoring ECU 58 may output an image, sound, and other information (data) to the in-vehicle network 66 as necessary.

The protection ECU 59 may be coupled to an airbag device 20 and a seatbelt device 10. The protection ECU 59 may control operation of the airbag device 20 and the seatbelt device 10, on the basis of information acquired from the in-vehicle network 66.

The external communication ECU 60 may wirelessly communicate with, for example, a communication base station 81 and a communication device of another automobile 82 that are present outside the automobile 1. The traffic system 80 may include the communication base station 81, the communication device of the other automobile 82, and a server device 83. The external communication ECU 60 may wirelessly transmit information acquired from the in-vehicle network 66 to the communication base station 81 and the communication device of the other automobile 82. The transmitted information may be used in the server device 83 or the other automobile 82, for example. The external communication ECU 60 may also receive information from the communication base station 81 and the communication device of the other automobile 82, and output the received information to the in-vehicle network 66. This enables the occupant monitoring ECU 58, for example, of the automobile 1 to transmit and receive information (data), via the external communication ECU 60, to/from the server device 83 or the other automobile 82 outside the automobile 1.

The control system 50 illustrated in FIG. 2 may operate by each unit being supplied with electric power from a battery 91 that is provided in the automobile 1. Electric power supply lines from the battery 91 to each unit may run throughout the automobile 1, together with communication cables of the in-vehicle network 66, for example. The control system 50 may be supplied with electric power from an electric power generator and an electric power receiver, in addition to the battery 91.

As described above, the automobile 1 may be provided with, to perform protection operation of protecting the occupant upon collision, the occupant protection device 26 including the seatbelt device 10 and the airbag device 20.

The seatbelt device 10 may include a seatbelt 11 to be stretched over the occupant who is seated in the seat 3. The seatbelt device 10 may apply tension to the seatbelt 11 upon collision, and restrain the occupant to make it difficult for the occupant to come away from the seat 3.

The airbag device 20 may include an airbag 21 to be deployed on, for example, the front side or the right or left side of the seat 3. The airbag device 20 may deploy the airbag 21 upon collision, and support the occupant to prevent the occupant from falling or coming away from the seat 3.

In this manner, the automobile 1 is able to protect the occupant in the automobile 1 upon collision. This makes it less likely for the occupant to greatly come away from a seating position, and is expected to offer a certain protection effect for the occupant.

However, even if the airbag 21 is deployed upon collision, a sufficient occupant protection effect is not necessarily offered.

For example, if high tension is suddenly applied to the seatbelt 11 upon collision, great force can instantaneously act on chests, for example, of some occupants. Such occupants may include an occupant who is caused to move forward, for example, by collision.

As described above, it is desired that the automobile 1 be further improved in occupant protection performance.

Figure 3:
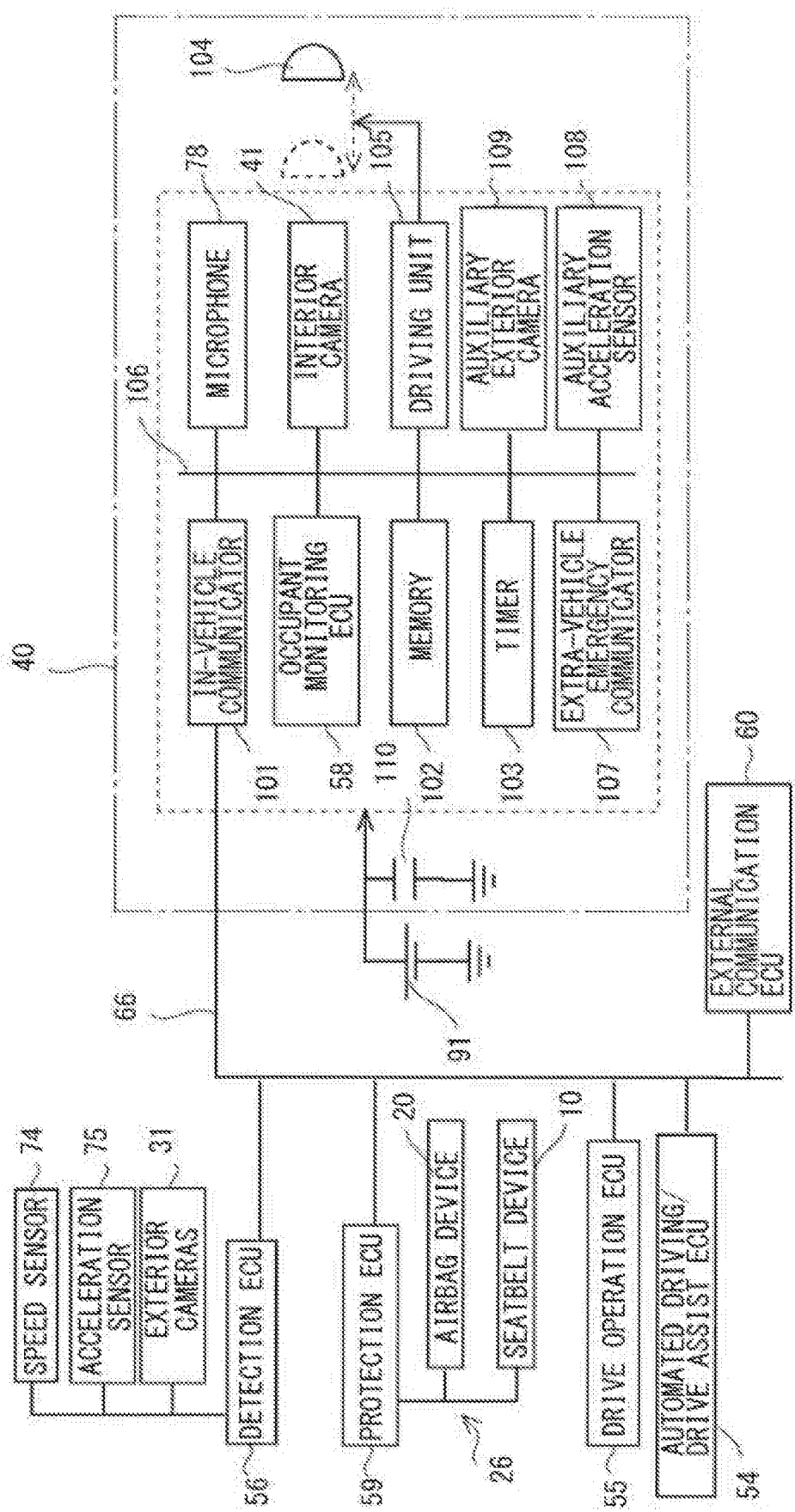
FIG. 3 is a block diagram illustrating an occupant monitoring device and an occupant protection device, in which the occupant monitoring device includes an occupant monitoring ECU illustrated in FIG. 2.

FIG. 3 is a block diagram illustrating the occupant monitoring device 40 and the occupant protection device 26. The occupant monitoring device 40 includes the occupant monitoring ECU 58 illustrated in FIG. 2.

The occupant monitoring device 40 in FIG. 3 may include an in-vehicle communicator 101, the occupant monitoring ECU 58, a memory 102, a timer 103, the microphone 78, the interior camera 41, a driving unit 105 of a lens 104, and an internal bus 106 that couple these elements. In addition to these elements, the occupant monitoring device 40 may independently include, for example, elements including an extra-vehicle emergency communicator 107, an auxiliary acceleration sensor 108, and an auxiliary exterior camera 109 that are coupled to the internal bus 106. The auxiliary exterior camera 109 may be configured to capture an image of a pedestrian, for example. This enables the occupant monitoring device 40 to independently perform a process upon collision.

Each unit of the occupant monitoring device 40 may be supplied with electric power from the battery 91 of the automobile 1. A path of the electric power supply may be coupled to a storage battery 110 that stores backup electric power. The occupant monitoring device 40 may be provided to be detachable from the automobile 1.

The in-vehicle communicator 101 may be coupled to the in-vehicle network 66. As illustrated in the drawing, for example, the in-vehicle communicator 101 may transmit and receive, via the in-vehicle network 66, information (data) to/from other control ECUs such as the detection ECU 56, the protection ECU 59 of the occupant protection device 26, or the external communication ECU 60.

The interior camera 41 may be an imaging device that captures an image of the cabin 2 of the automobile 1. The interior camera 41 may be able to capture an image of the occupant in the automobile 1.

The driving unit 105 may drive the lens 104, and control a position of the lens 104. Controlling the position of the lens 104 causes an angle of view of the interior camera 41 to change. If the lens 104 is controlled to a farthest position, the interior camera 41 may capture an image of an upper body including the head of the occupant serving as a driver, as indicated by a chain double-dashed line frame in FIG. 1B, for example. The occupant serving as the driver may be seated in the seat 3 to operate the steering wheel 5, for example. If the lens 104 is controlled to a nearest position, the interior camera 41 may capture an image of the whole of the cabin 2, as indicated by a chain line frame in FIG. 1B, for example. In this case, it is possible for the interior camera 41 to capture an image of, in addition to the occupant serving as the driver, another occupant who is seated in the seat 3 at a passenger seat or rear seats.

The microphone 78 may convert sound of the cabin 2 of the automobile 1 into an electrical signal.

The timer 103 may measure elapsed time or a time.

The extra-vehicle emergency communicator 107 may be a communication device that is able to communicate with the communication base station 81 or the other automobile 82 outside the automobile 1 in, for example, an emergency such as an accident. The extra-vehicle emergency communicator 107 may communicate with the communication base station 81 or the other automobile 82 by the same communication method as that used by the external communication ECU 60.

Like the acceleration sensor 75, the auxiliary acceleration sensor 108 may detect an acceleration that acts on the automobile 1.

The memory 102 may record various kinds of information, such as images and detection values, acquired by the occupant monitoring device 40. The memory 102 may also record a program for occupant monitoring.

The occupant monitoring ECU 58 may read the program for occupant monitoring from the memory 102 and perform the program. Thus, the occupant monitoring ECU 58 may serve as a controller of the occupant monitoring device 40. The controller of the occupant monitoring device 40 may control overall operation of the occupant monitoring device 40, enabling the occupant monitoring device 40 to achieve occupant monitoring.

For example, the occupant monitoring ECU 58 may determine whether the occupant is aware of collision of the automobile 1, on the basis of the image of the occupant in the automobile 1 captured by the interior camera 41.

The occupant protection device 26 may include the protection ECU 59, the airbag device 20, and the seatbelt device 10.

For example, in a case where the acceleration sensor 75 detects collision of the automobile 1, the protection ECU 59 of the occupant protection device 26 may perform restraint by the seatbelt 11 for the occupant in the automobile 1, depending on whether the occupant is aware of the collision, which is determined by the occupant monitoring device 40.

Figure 4:
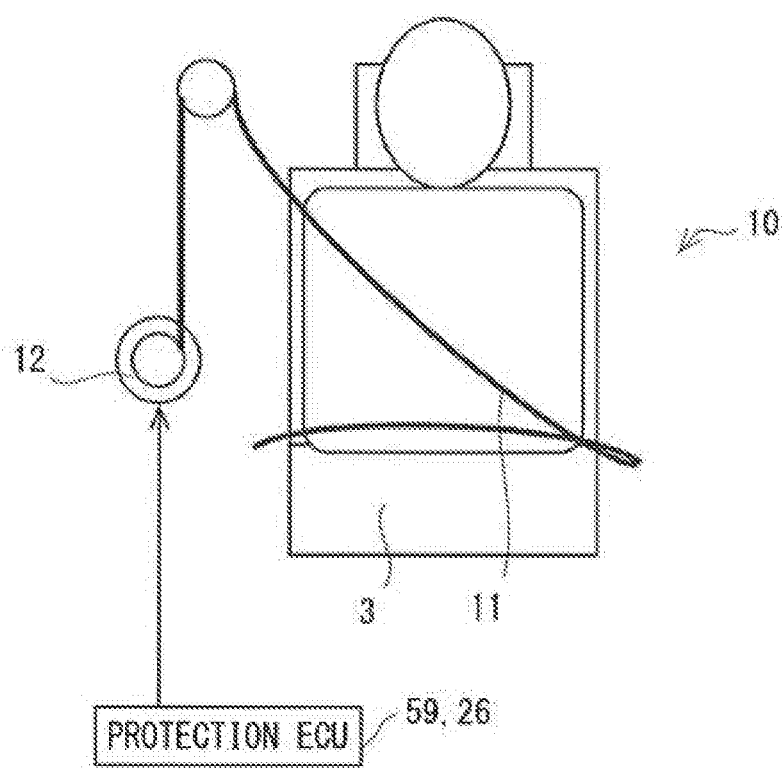
FIG. 4 is an explanatory diagram illustrating an example of a seatbelt device that is controlled by protection operation of the occupant protection device illustrated in FIG. 3.

FIG. 4 is an explanatory diagram illustrating an example of the seatbelt device 10 that is controlled by protection operation of the occupant protection device 26 illustrated in FIG. 3.

FIG. 4 is a front view of the occupant seated in the seat 3.

The seatbelt device 10 may include the seatbelt 11 and an actuator that winds the seatbelt 11. The seatbelt 11 may be stretched over a waist and the upper body of the occupant seated in the seat 3.

The protection ECU 59 of the occupant protection device 26 may control activation and stop of the actuator and driving force of the activated actuator. The seatbelt 11 may be wound by the driving force of the activated actuator to restrain the occupant seated in the seat 3. For example, in a state in which the seatbelt 11 is wound to press the occupant against the seat 3, the driving force of the actuator may serve as restraining force of the seatbelt 11.

Figure 5:
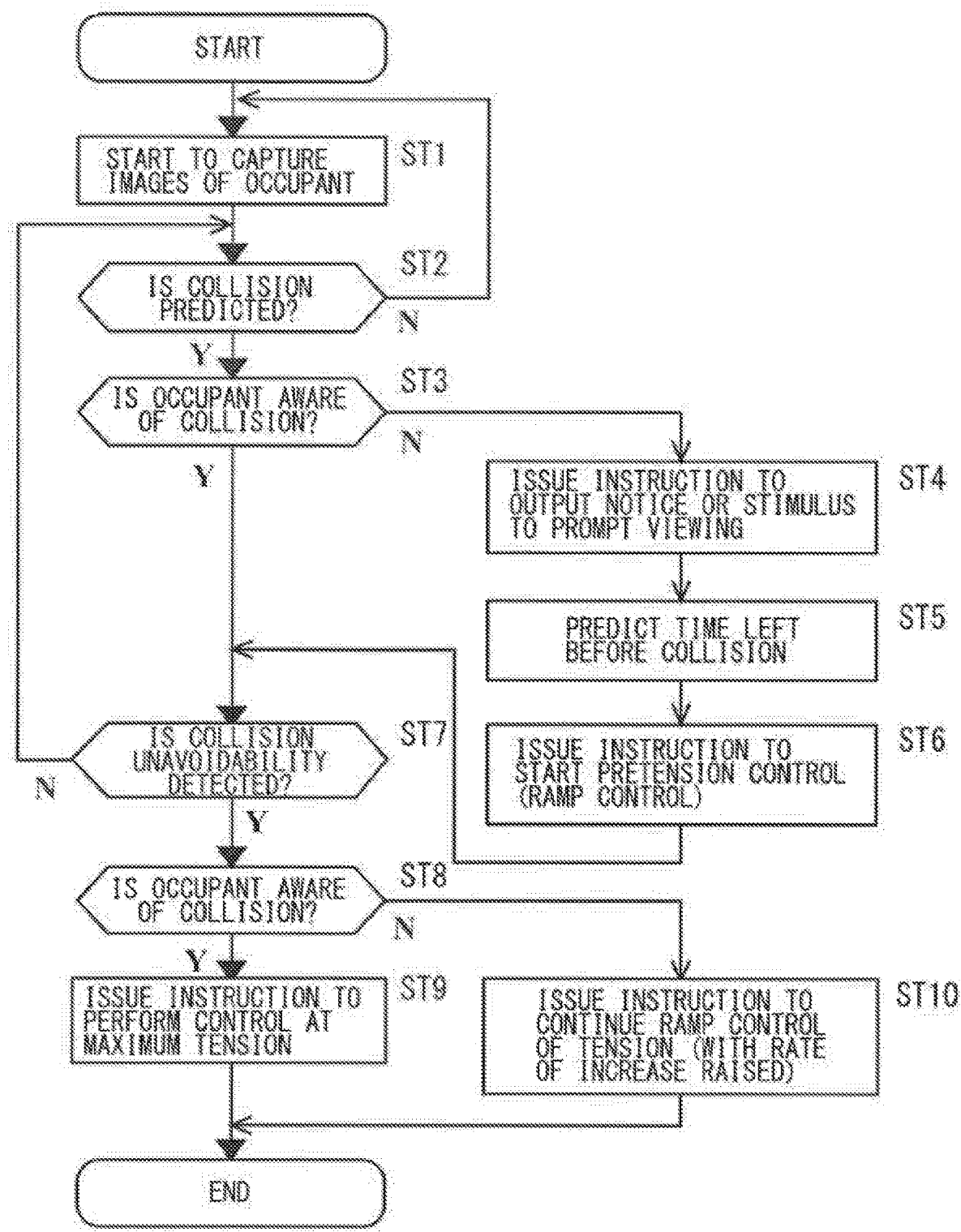
FIG. 5 is a flowchart illustrating a monitoring process for occupant protection that is performed by the occupant monitoring ECU of the occupant monitoring device illustrated in FIG. 3.

FIG. 5 is a flowchart illustrating a monitoring process for occupant protection that is performed by the occupant monitoring ECU 58 of the occupant monitoring device 40 illustrated in FIG. 3.

For example, when the occupant goes on board the automobile 1 and the occupant monitoring device 40 starts operation, the occupant monitoring ECU 58 may perform the process illustrated in FIG. 5.

In step ST1, the occupant monitoring ECU 58 may start capturing of images of the occupant by the interior camera 41, and start to acquire the captured images.

In step ST2, the occupant monitoring ECU 58 may determine whether collision is predicted. For example, the occupant monitoring ECU 58 may acquire, from the in-vehicle communicator 101, collision prediction that has been outputted to the in-vehicle network 66 by the detection ECU 56, and determine whether collision is predicted. In another example, the external communication ECU 60 may receive the possibility of collision for the automobile 1 or the other automobile 82 preceding the automobile 1 from the other automobile 82 or the communication base station 81, for example, and output information of collision ahead to the in-vehicle network 66. In that case, the occupant monitoring ECU 58 may acquire the information of collision ahead, and determine whether collision is predicted. In a case where no collision is predicted (ST2: N), the occupant monitoring ECU 58 may return the process to step ST1. In a case where collision is predicted (ST2: Y), the occupant monitoring ECU 58 may advance the process to step ST3.

In addition, the occupant monitoring ECU 58 may instruct the driving unit 105 to switch an angle of view, to switch the angle of view from narrow-angle to wide-angle. Thus, the interior camera 41 may be switched from a state of capturing an image of only the driver to a state of capturing an image of the whole of the cabin 2. On the basis of the image captured by the interior camera 41, the occupant monitoring ECU 58 is able to determine an orientation or a motion of the upper body or the head for not only the driver but also another occupant other than the driver.

In step ST3, the occupant monitoring ECU 58 may determine whether the occupant is aware of the collision.

The occupant monitoring ECU 58 may extract an image of the occupant's eyeball from the acquired captured image on the basis of features, and determine a line-of-sight direction of the occupant from the extracted image. The occupant monitoring ECU 58 may extract an image of the occupant's head from the acquired captured image on the basis of features, and determine a direction of the occupant's head from the extracted image.

For example, the occupant monitoring ECU 58 may compare an input direction of impact due to the collision included in the collision prediction acquired in step ST2, with the specified line-of-sight direction of the occupant. In a case where these directions have an angular difference less than a predetermined angular difference, the occupant monitoring ECU 58 may determine that the occupant is aware of the collision (ST3: Y), and advance the process to step ST7. In contrast, in a case where these directions have an angular difference equal to or greater than the predetermined angular difference, the occupant monitoring ECU 58 may determine that the occupant is unaware of the collision (ST3: N), and advance the process to step ST4.

In step ST4, the occupant monitoring ECU 58 may issue an instruction to output a notice or a stimulus to cause the occupant to view a direction in which the collision is predicted.

For example, the occupant monitoring ECU 58 may cause the display 76 of the UIECU 61 to display the viewing direction as a notice. The occupant monitoring ECU 58 may output a notice, by sound, from a speaker (not illustrated) of the UIECU 61. In another example, the occupant monitoring ECU 58 may apply microcurrent to the occupant by a current-carrying device (not illustrated) provided in the seat 3 or the steering wheel 5.

In step ST5, the occupant monitoring ECU 58 may predict time left before the collision. The occupant monitoring ECU 58 may predict the time left before the collision, by subtracting the elapsed time measured by the timer 103 from a period until the collision included in the collision prediction acquired in step ST2.

In step ST6, the occupant monitoring ECU 58 may instruct the protection ECU 59 to start pretension control by the seatbelt 11.

For example, the occupant monitoring ECU 58 may instruct the protection ECU 59 to start ramp control of sequentially increasing driving force (restraining force) of the seatbelt 11, to attain a maximum tension in the time left before the collision.

The protection ECU 59 may start the pretension control by the seatbelt 11, by using an actuator 12. The protection ECU 59 may start the ramp control of sequentially increasing the driving force (restraining force) of the seatbelt 11.

When the collision of the automobile 1 is predicted, the protection ECU 59 may start operation of gradually increasing the tension of the seatbelt 11 in a case where the occupant monitoring device 40 determines that the occupant is unaware of collision to occur.

In step ST7, the occupant monitoring ECU 58 may determine whether a state in which the collision is unavoidable is detected.

The occupant monitoring ECU 58 may determine whether the state in which the collision is unavoidable is detected by, for example, detecting the collision by acquiring an acceleration that acts on the automobile 1 due to the collision.

For example, the occupant monitoring ECU 58 may acquire, from the in-vehicle communicator 101, collision detection that has been outputted to the in-vehicle network 66 by the detection ECU 56, and determine whether the state in which the collision is unavoidable is detected.

In a case where the state in which the collision is unavoidable is not detected (ST7: N), the occupant monitoring ECU 58 may return the process to step ST2. In a case where the state in which the collision is unavoidable is detected (ST7: Y), the occupant monitoring ECU 58 may advance the process to step ST8.

In step ST8, the occupant monitoring ECU 58 may determine again whether the occupant is aware of the collision.

On the basis of an image captured after the process in step ST3, the occupant monitoring ECU 58 may determine whether the occupant is aware of the collision by a process similar to that in step ST3.

In a case where it is determined that the occupant is aware of the collision (ST8: Y), the occupant monitoring ECU 58 may advance the process to step ST9. In a case where it is determined that the occupant is unaware of the collision (ST8: N), the occupant monitoring ECU 58 may advance the process to step ST10.

In step ST9, the occupant monitoring ECU 58 may issue an instruction to perform the pretension control by the seatbelt 11 at a maximum output.

The protection ECU 59 may start the pretension control by the seatbelt 11, by using the actuator 12. The protection ECU 59 may start the restraint by the seatbelt 11 at the maximum output.

After refraining from starting operation of increasing the tension of the seatbelt 11 even though the collision of the automobile 1 is predicted, when it is detected that the collision of the automobile 1 is unavoidable, the protection ECU 59 may start operation of immediately increasing the tension of the seatbelt 11 to the maximum tension.

In step ST10, the occupant monitoring ECU 58 may issue an instruction to continue the pretension control by the seatbelt 11 started in step ST6. The occupant monitoring ECU 58 may issue an instruction to continue the pretension control by the ramp control, with a rate of increase of the driving force (restraining force) raised.

The protection ECU 59 may continue the ramp control of the restraining force of the seatbelt 11 started in step ST6.

The protection ECU 59 may continue the ramp control of the restraining force of the seatbelt 11 started in step ST6, with the rate of increase of the restraining force raised as compared with that in step ST6.

After starting the operation of gradually increasing the tension of the seatbelt 11, when it is detected that the collision of the automobile 1 is unavoidable, the protection ECU 59 may continue the operation of increasing the tension of the seatbelt 11, with a rate of increase of the tension raised.

Figure 6:
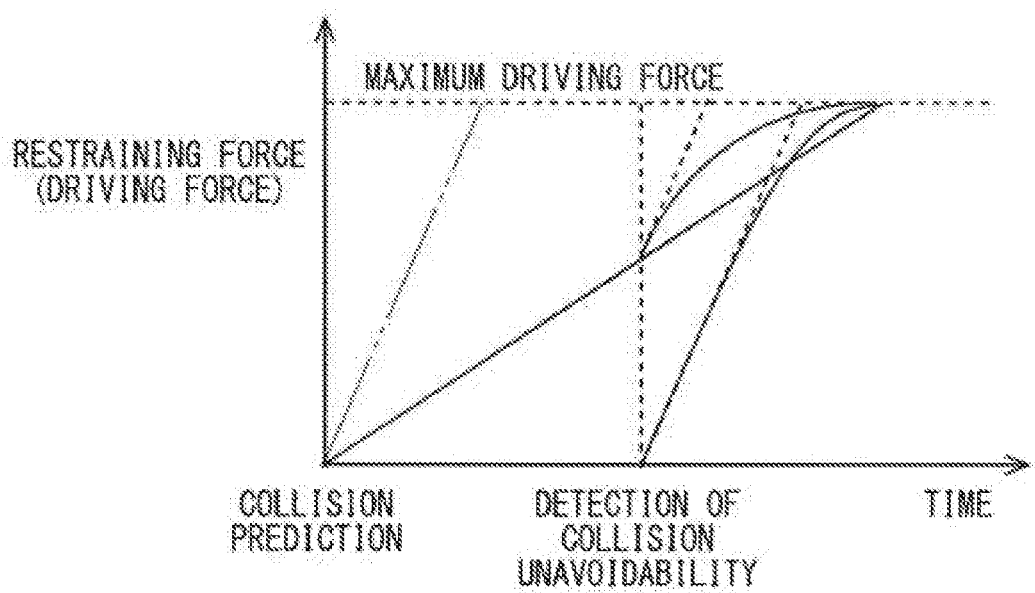
FIG. 6 is an explanatory diagram illustrating an example of a change in restraining force of a seatbelt, in which the change is caused by an actuator of the occupant protection device, and is based on the process illustrated in FIG. 5.

FIG. 6 is an explanatory diagram illustrating an example of a change in restraining force of the seatbelt 11. The change is caused by the actuator 12 of the occupant protection device 26, and is based on the process illustrated in FIG. 5.

The horizontal axis of FIG. 6 represents elapsed time from timing of the collision prediction. The vertical axis of FIG. 6 represents the restraining force (driving force) of the seatbelt 11.

As illustrated in FIG. 6, in a case where the occupant is aware of collision when the collision is predicted, the actuator 12 may refrain from starting operation.

Thereafter, when unavoidability of the collision is detected, the actuator 12 may cause the seatbelt 11 to exert a maximum restraining force (driving force), regardless of whether the occupant is aware of the collision at that point in time.

In contrast, in a case where the occupant is unaware of the collision when the collision is predicted, the actuator 12 of the occupant protection device 26 may start, from the timing of the collision prediction, the ramp control of sequentially increasing the restraining force (driving force).

Thereafter, when unavoidability of the collision is detected, the actuator 12 may change the rate of increase of the restraining force (driving force), depending on whether the occupant is aware of the collision at that point in time, and continue the ramp control of the restraining force of the seatbelt 11. For example, in a case where the occupant is aware of the collision, the ramp control of the restraining force of the seatbelt 11 may be continued, with the rate of increase of the restraining force (driving force) raised. In a case where the occupant is not yet aware of the collision, the ramp control of the restraining force of the seatbelt 11 may be continued, without raising the rate of increase of the restraining force (driving force).

In this manner, in a case where the occupant monitoring ECU 58 of the occupant monitoring device 40 determines that the occupant is unaware of collision of the automobile 1 when the collision is predicted, the protection ECU 59 may increase the tension of the seatbelt 11 gradually, e.g., slowly, as compared with a case where it is determined that the occupant is aware of the collision.

For example, the protection ECU 59 may increase the tension of the seatbelt 11 at a gradual rate of increase to attain a slope less than that of a chain line in the drawing. The chain line in the drawing is illustrated to have the same slope as that of a tangent in a case where it is detected that collision is unavoidable and the maximum restraining force (driving force) is exerted. The tangent is indicated by a dashed line in the drawing.

As described above, in the example embodiment, the occupant monitoring ECU 58 of the occupant monitoring device 40 determines whether the occupant in the automobile 1 is aware of collision of the automobile 1. In a case where the occupant monitoring ECU 58 determines that the occupant is unaware of the collision of the automobile 1, the protection ECU 59 of the occupant protection device 26 increases the tension of the seatbelt 11 gradually, as compared with a case where it is determined that the occupant is aware of the collision. Thus, in a case where the occupant is aware of the collision of the automobile 1, it is possible to immediately apply high tension to the seatbelt 11 upon the collision, to firmly and reliably support the occupant who is expected to be bracing for the collision. In contrast, in a case where the occupant is unaware of the collision, the tension of the seatbelt 11 is increased gradually as compared with a case where the occupant is aware of the collision. This makes it possible to support the occupant who is in a normal state because of being unaware of the collision, without instantaneously applying great force to the chest of the occupant. By thus adjusting the tension of the seatbelt 11 on the basis of whether the occupant is aware of the collision, it is possible to perform occupant protection at an appropriate tension corresponding to a state of reaction of the occupant's body. It is expectable that the automobile 1 be further improved in occupant protection performance.

In the example embodiment, the occupant monitoring ECU 58 may determine whether the occupant is aware of the collision, on the basis of a motion of the occupant's head or eyeball in a direction in which the collision of the automobile 1 is predicted or detected, in an image captured by the imaging device that is able to capture an image of the occupant in the automobile 1. This makes it possible to determine, with high accuracy, whether the occupant is aware of the collision.

In another example, the occupant monitoring ECU 58 may determine whether the occupant is aware of the collision, on the basis of any of a degree of opening of the occupant's pupil, facial expressions, a sudden motion of the occupant, and a pulse rate of the occupant that are observable in an image, or an operation performed on the automobile 1. As the degree of opening of the occupant's pupil, for example, it may be determined whether the pupil is open to a greater degree than usual. Also in this case, it is possible for the occupant monitoring ECU 58 to determine, with high accuracy, whether the occupant is aware of the collision.

It is to be noted that a pulse of the occupant is observable from, for example, an infrared image of the occupant's arm. In another example, the pulse may be detected by a pulse sensor, such as a pulse sensor coupled to the occupant monitoring ECU 58 or a non-contact pulse sensor.

In the example embodiment, when the collision of the automobile 1 is predicted, the occupant monitoring ECU 58 may determine whether to start the operation of gradually increasing the tension of the seatbelt 11, and the protection ECU 59 may operate on the basis of a result of the determination. For example, in a case where the occupant monitoring ECU 58 determines that the occupant is unaware of the collision, the protection ECU 59 may start the operation of gradually increasing the tension of the seatbelt 11. In a case where the occupant monitoring ECU 58 determines that the occupant is aware of the collision, the protection ECU 59 may refrain from starting the operation of increasing the tension of the seatbelt 11 even if the collision of the automobile 1 is predicted.

Thus, for the occupant who is unaware of the possibility of the collision, restraint of the occupant may be started early from a point in time of the prediction to refrain from suddenly applying strong restraining force to the occupant. This helps to obtain appropriate restraining force at a point in time of the collision. For example, in the example embodiment, after starting the operation of gradually increasing the tension of the seatbelt 11, when it is detected that the collision of the automobile 1 is unavoidable, the protection ECU 59 may continue the operation of increasing the tension of the seatbelt 11, with a rate of increase of the tension raised. Thus, even in a case where a period from collision prediction to detection of collision unavoidability is very short, this helps to obtain appropriate restraining force at the point in time of the collision.

For the occupant who is aware of the collision and expected to be bracing for the collision, it is possible to allow a degree of freedom for the body by refraining from starting restraint at the point in time of the prediction. Thereafter, the occupant may be restrained at once upon the detection of collision unavoidability. This helps to appropriately restrain, by the seatbelt 11, the occupant who properly reseated him/herself at the seating position of the seat 3 before the collision, for example.

For example, in the example embodiment, after refraining from starting the operation of increasing the tension of the seatbelt 11 even though the collision of the automobile 1 is predicted, when it is detected that the collision of the automobile 1 is unavoidable, the protection ECU 59 may start the operation of immediately increasing the tension of the seatbelt 11 to the maximum tension. Thus, even if strong restraining force is exerted immediately after the detection of collision unavoidability, this helps to obtain appropriate restraining force at the point in time of the collision without causing an issue.

Thus, in the example embodiment, it is possible to appropriately restrain the occupant upon collision, while preventing occurrence of issues that can be caused by the occupant being suddenly restrained by high restraining force of the seatbelt 11 without being aware of the collision.

To protect an occupant, a vehicle uses an occupant protection device such as a seatbelt device (see JP-A No. 2000-016230). The seatbelt device causes a seatbelt to be stretched over a waist and an upper body of the occupant seated in a seat, and stops unwinding of the seatbelt to support the occupant upon collision. This makes it less likely for the occupant to greatly come away from a seating position. The seatbelt device may exert a certain protection effect for the occupant.

However, if high tension is suddenly applied to the seatbelt upon collision, great force can instantaneously act on chests, for example, of some occupants. Such occupants may include an occupant who is caused to move forward, for example, by collision.

As described above, it is desirable to allow a vehicle to be further improved in occupant protection performance.

Although some example embodiments of the technology have been described in the foregoing, the technology is by no means limited to the example embodiments. Various changes and modifications may be made to any embodiment without departing from the scope of the technology.

The occupant monitoring ECU 58 and the protection ECU 59 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant monitoring ECU 58 and the protection ECU 59. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the occupant monitoring ECU 58 and the protection ECU 59 illustrated in FIGS. 2 and 3.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. A vehicle with an occupant protection function, the vehicle comprising:
   an occupant protection device provided in the vehicle and configured to perform protection operation of supporting, with a seatbelt, an occupant in the vehicle upon collision of the vehicle; and
   an occupant monitoring device provided in the vehicle and configured to monitor the occupant in the vehicle, the occupant monitoring device being configured to determine whether the occupant in the vehicle is aware of the collision of the vehicle to occur, the occupant protection device being configured to, in a case where the occupant monitoring device determines that the occupant is unaware of the collision of the vehicle to occur, increase tension of the seatbelt gradually as compared with a case where the occupant monitoring device determines that the occupant is aware of the collision, wherein
   the occupant monitoring device comprises an imaging device configured to capture an image of the occupant and to determine whether the occupant in the vehicle is aware of the collision of the vehicle to occur on a basis of a line-of-sight direction of the occupant determined from the image,
   the occupant monitoring device compares an input direction of impact due to the collision with the line-of-sight direction and when the comparison indicates that an angular difference is less than a predetermined angular difference, the occupant monitoring device determines that the occupant is aware of the collision.

2. The vehicle with the occupant protection function, according to claim 1, wherein the occupant protection device is configured to
   start operation of gradually increasing the tension of the seatbelt in a case where the occupant monitoring device determines that the occupant is unaware of the collision to occur when the collision of the vehicle is predicted, and
   refrain from starting operation of increasing the tension of the seatbelt even if the collision of the vehicle is predicted in a case where the occupant monitoring device determines that the occupant is aware of the collision to occur.

3. The vehicle with the occupant protection function, according to claim 2, wherein the occupant protection device is configured to continue the operation of increasing the tension of the seatbelt, with a rate of increase of the tension raised, when the collision of the vehicle is detected as being unavoidable after starting the operation of gradually increasing the tension of the seatbelt.

4. The vehicle with the occupant protection function, according to claim 2, wherein the occupant protection device is configured to start operation of immediately increasing the tension of the seatbelt, when the collision of the vehicle is detected as being unavoidable after refraining from starting the operation of increasing the tension of the seatbelt even though the collision of the vehicle is predicted.

5. The vehicle with the occupant protection function, according to claim 3, wherein the occupant protection device is configured to start operation of immediately increasing the tension of the seatbelt, when the collision of the vehicle is detected as being unavoidable after refraining from starting the operation of increasing the tension of the seatbelt even though the collision of the vehicle is predicted.

6. The vehicle with the occupant protection function, according to claim 1 wherein the seatbelt is provided on a passenger seat and the occupant is a human seated in the passenger seat.

\* \* \* \* \*